A. C. JOHNSON.
INDICATING AND RECORDING APPARATUS.
APPLICATION FILED DEC. 6, 1918.

1,422,207.

Patented July 11, 1922.
6 SHEETS—SHEET 1.

Witnesses:
Harry R. L. White
W. F. Kilroy

Inventor:
Austin C. Johnson
By Barnett Heumann
Attys.

A. C. JOHNSON.
INDICATING AND RECORDING APPARATUS.
APPLICATION FILED DEC. 6, 1918.
1,422,207.
Patented July 11, 1922.
6 SHEETS—SHEET 2.
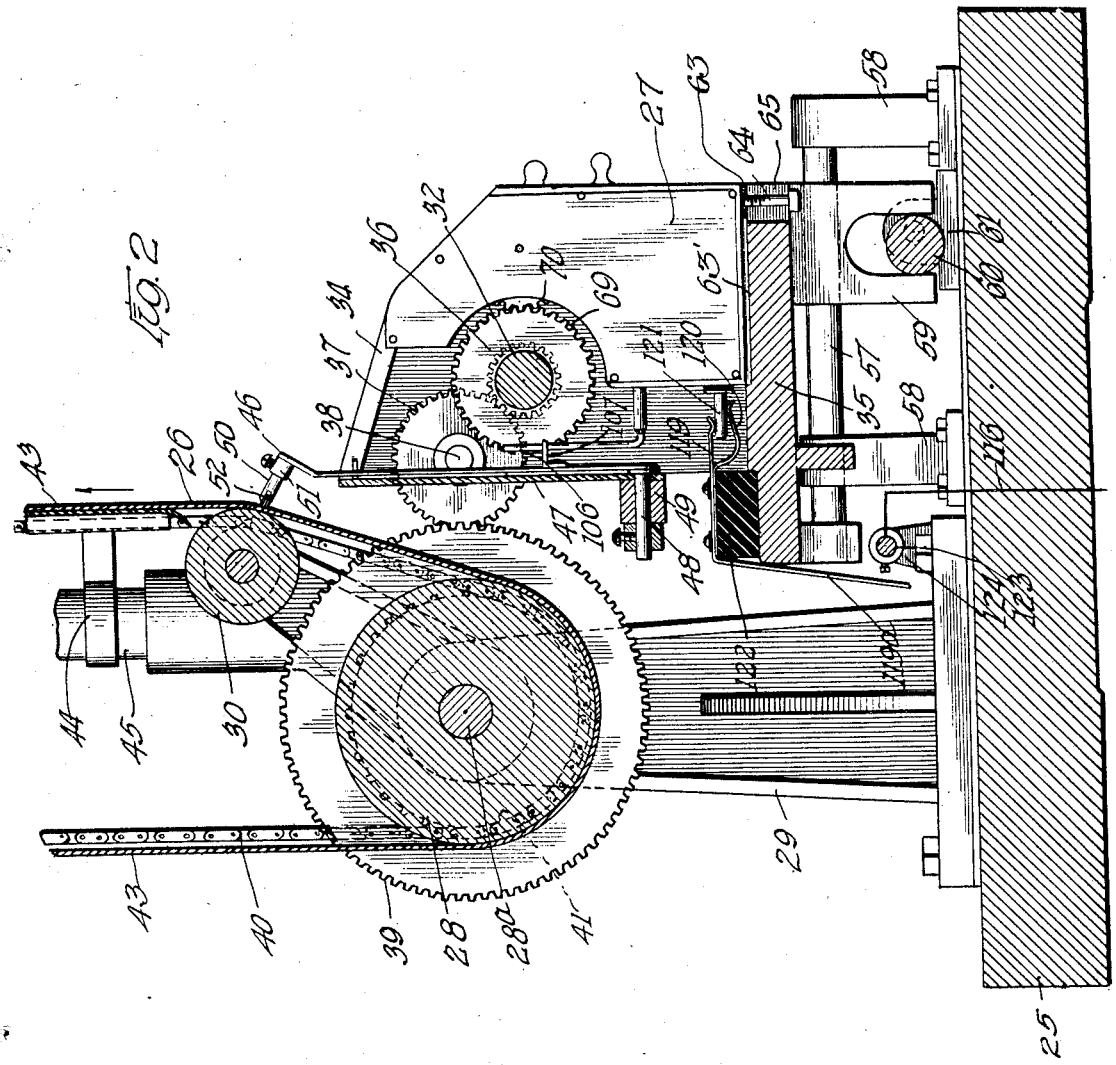
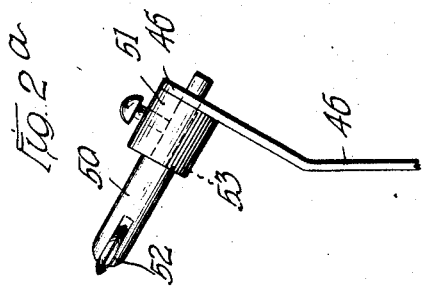

A. C. JOHNSON.
INDICATING AND RECORDING APPARATUS.
APPLICATION FILED DEC. 6, 1918.
1,422,207.
Patented July 11, 1922.
6 SHEETS—SHEET 3.
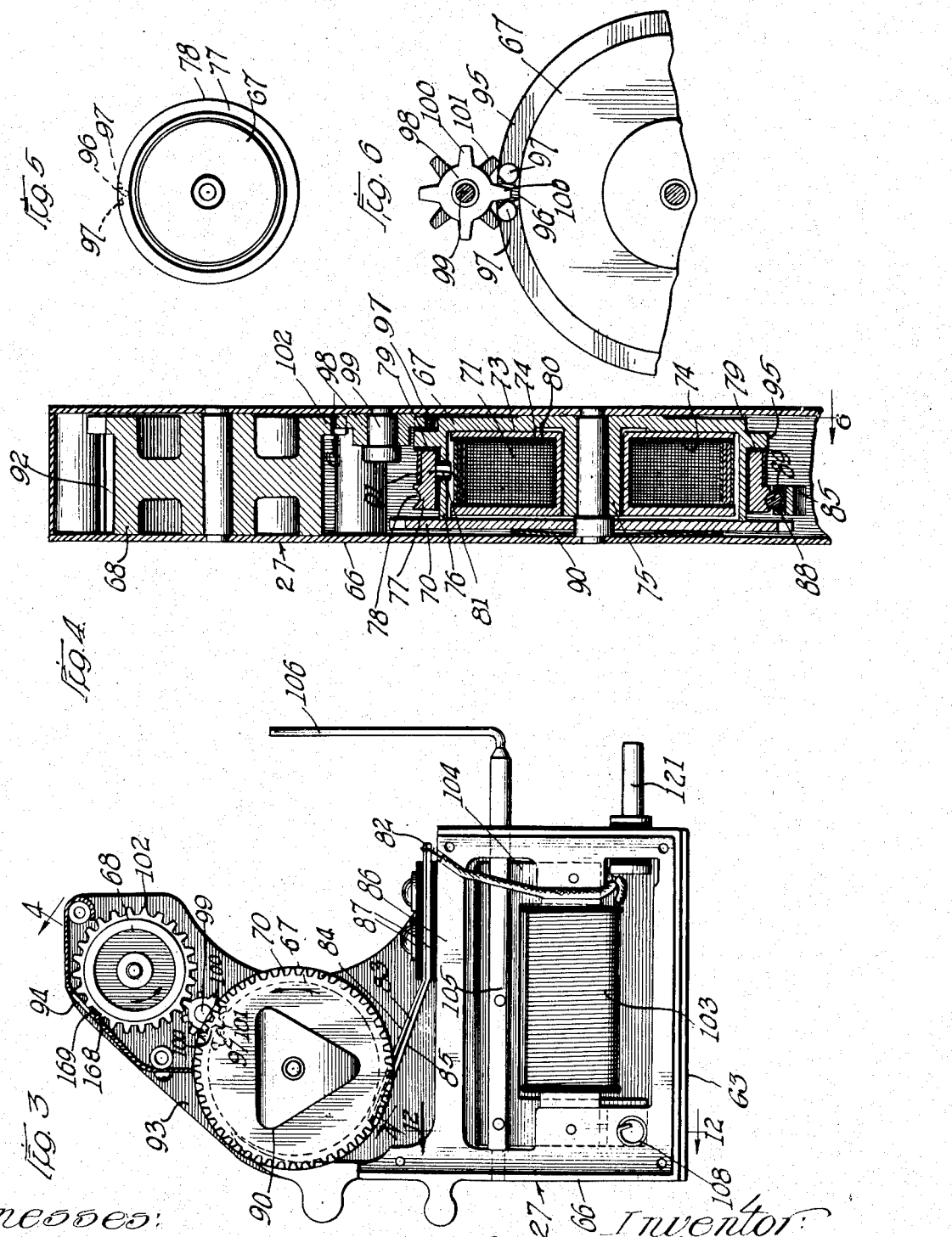

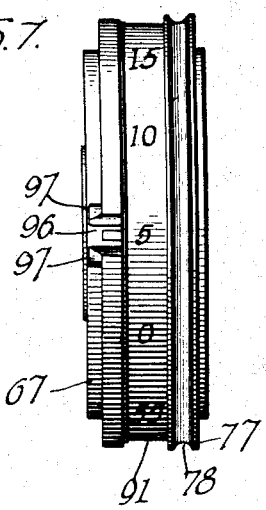
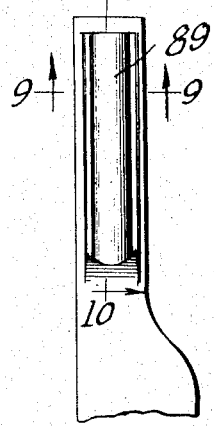
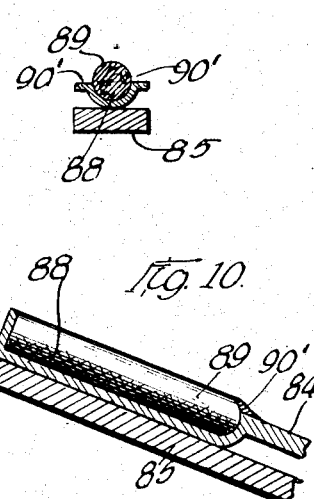
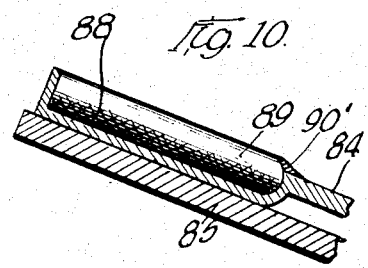
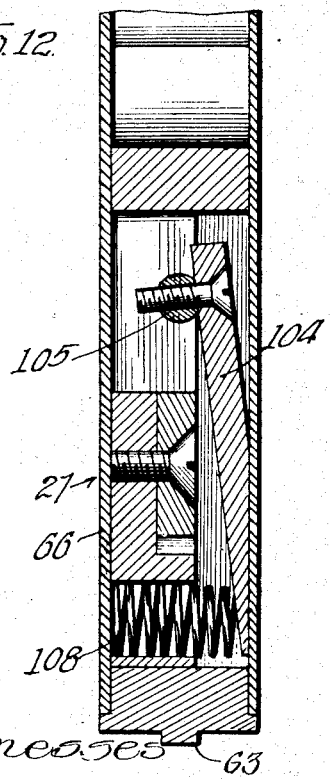
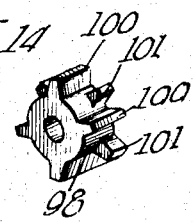
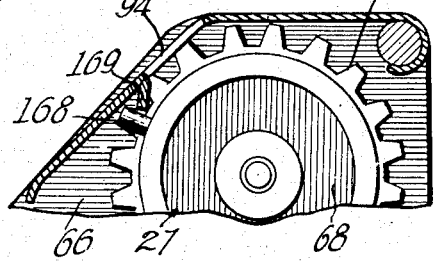
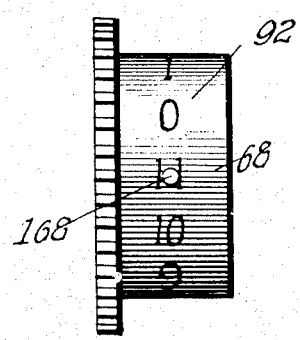

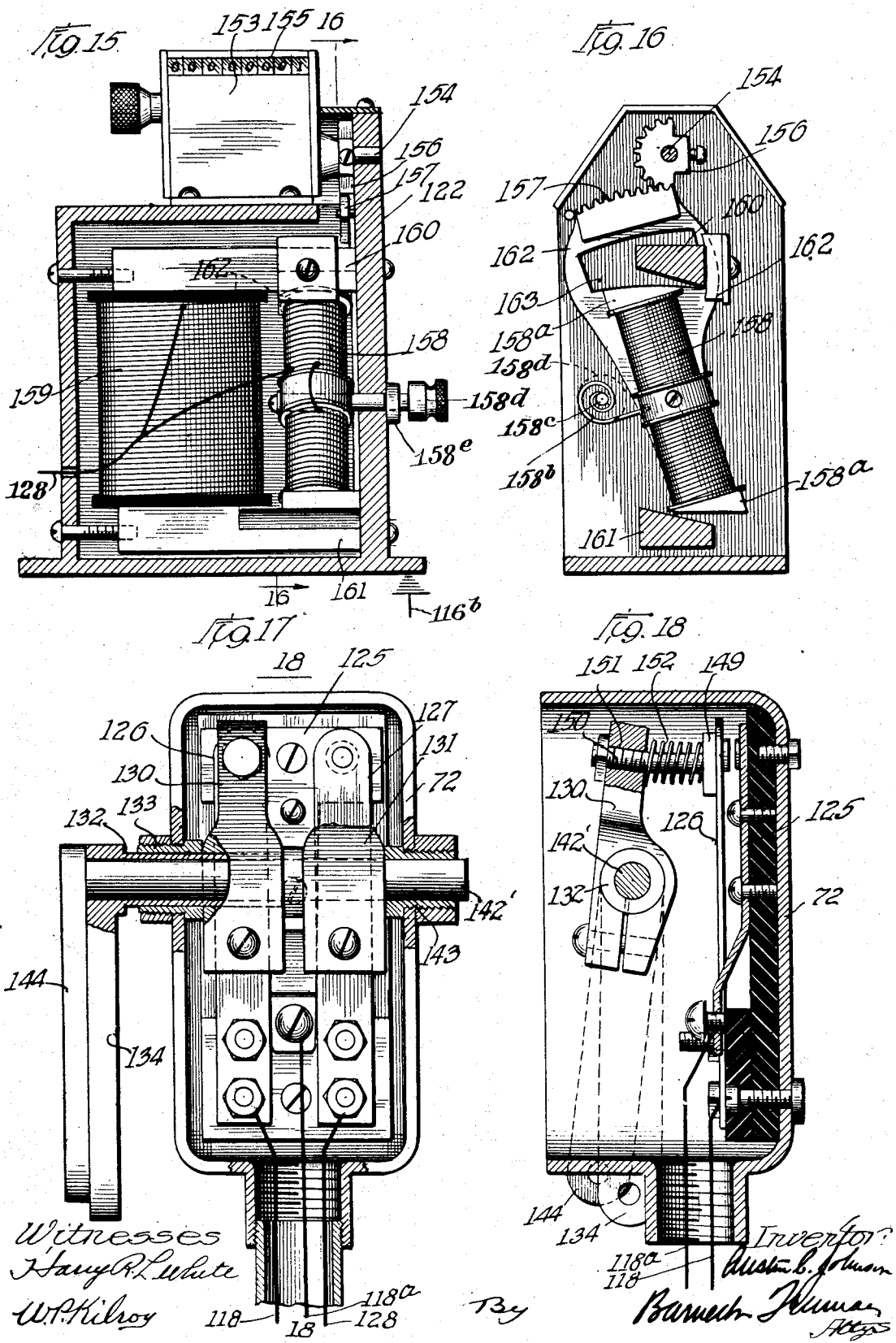

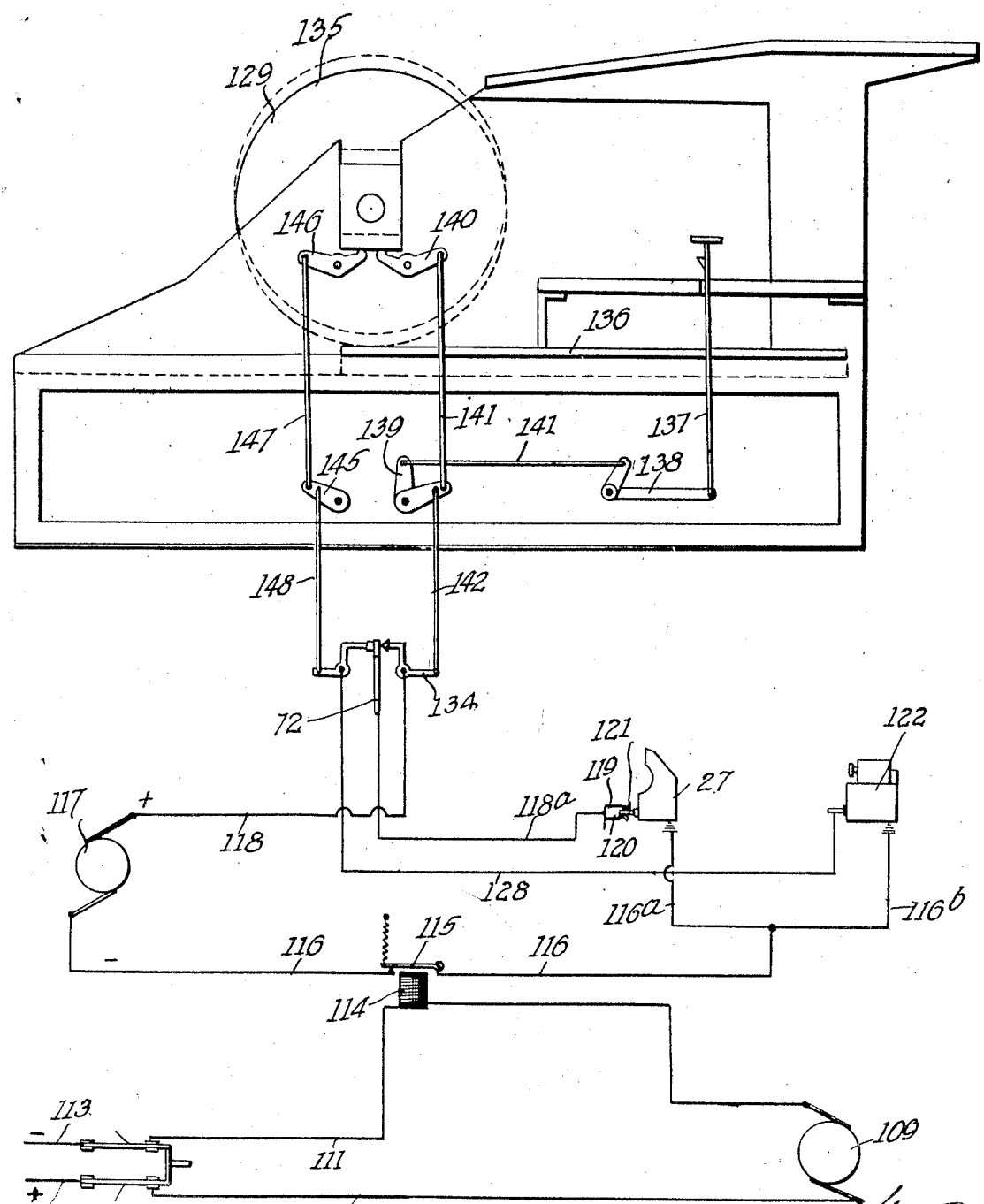

UNITED STATES PATENT OFFICE.

AUSTIN C. JOHNSON, OF CHICAGO, ILLINOIS, ASSIGNOR TO PRODUCTION METER COMPANY, OF CHICAGO, ILLINOIS, A CORPORATION OF ILLINOIS.

INDICATING AND RECORDING APPARATUS.

1,422,207.  Specification of Letters Patent.  Patented July 11, 1922.

Application filed December 6, 1918. Serial No. 265,544.

*To all whom it may concern:*

Be it known that I, AUSTIN C. JOHNSON, a citizen of the United States, residing at Chicago, in the county of Cook and State of Illinois, have invented certain new and useful Improvements in Indicating and Recording Apparatus, of which the following is a specification.

My invention relates to an apparatus for giving a visual indication, and also if desired, making a permanent record of the actual operating period of a machine, when performing one or more complete operations or a series of intermittent operations. The invention relates, more particularly, to certain improvements in an apparatus of the above character disclosed in my Patent No. 1,283,789.

In order to produce reliable results with an indicating and recording apparatus it is essential that the various operating parts of the apparatus operate with perfect accuracy. This is particularly true when the apparatus is employed to give a visual indication or make a permanent record of another machine, the active operating periods of which are frequent and of short duration, such for example, as the operation of a printing press. Such indicating and recording devices are intended to enable the superintending officer of a factory to keep an accurate account of the operations of a large number of machines, and to ascertain at a glance the total time covering a plurality of active operations of any particular machine. It is therefore very desirable that an apparatus of this character be compact so that it can be conveniently arranged in the superintendent's office without requiring a large space. It is also desirable that the mechanism of the apparatus be noiseless in its operation so as not to disturb the occupants of the office. It is also essential that each of the indicating units be capable of being readily removed from the apparatus without interfering with the operation of the other units. This removable feature is important when it is desired to repair one of the units or when it is desired to separately indicate the amount of time spent by two or more workmen who have worked on the same machine at different times during the same day. It is also desirable that all of the indicating units be capable of being set back to zero at the end of each working period.

My invention aims to provide an improved indicating and recording apparatus which will meet the above requirements of an apparatus of this character more satisfactory than any of the other indicating and recording machines which have heretofore been put into service, and also to provide certain other improvements in machines of this sort, as will be apparent from the following specification.

The customary method of maintaining a high productive efficiency of any particular machine in a factory is to determine the time required by the average workman to finish the article or part thereof which is made by the machine in question. Such period should include the time required for the machine to complete its part of the work and also the time allowed for the machine operator to handle the material. My invention contemplates a novel apparatus which will accurately record and indicate the total time required for a machine to perform a plurality of active operations and also indicate the exact number of such operations performed during the period of time indicated. With this apparatus it can be readily ascertained whether the machine and the workman are performing their separate duties within the prescribed time. In this connection the invention, more specifically, contemplates the provision of an electrically operated counting device which is actuated only during the said active period of the machine.

The invention consists in the novel arrangements, construction and combinations of parts and devices hereinafter described and claimed for carrying out the above stated objects, and such other objects as may be apparent from the following detailed description.

The invention is illustrated in a preferred embodiment in the accompanying drawings wherein like characters of reference designate like parts, and wherein:

Fig. 2 is a sectional view taken on line 2—2 of Fig. 1, illustrating the connections between one of the indicating units and the driving mechanism.

Figure 1:
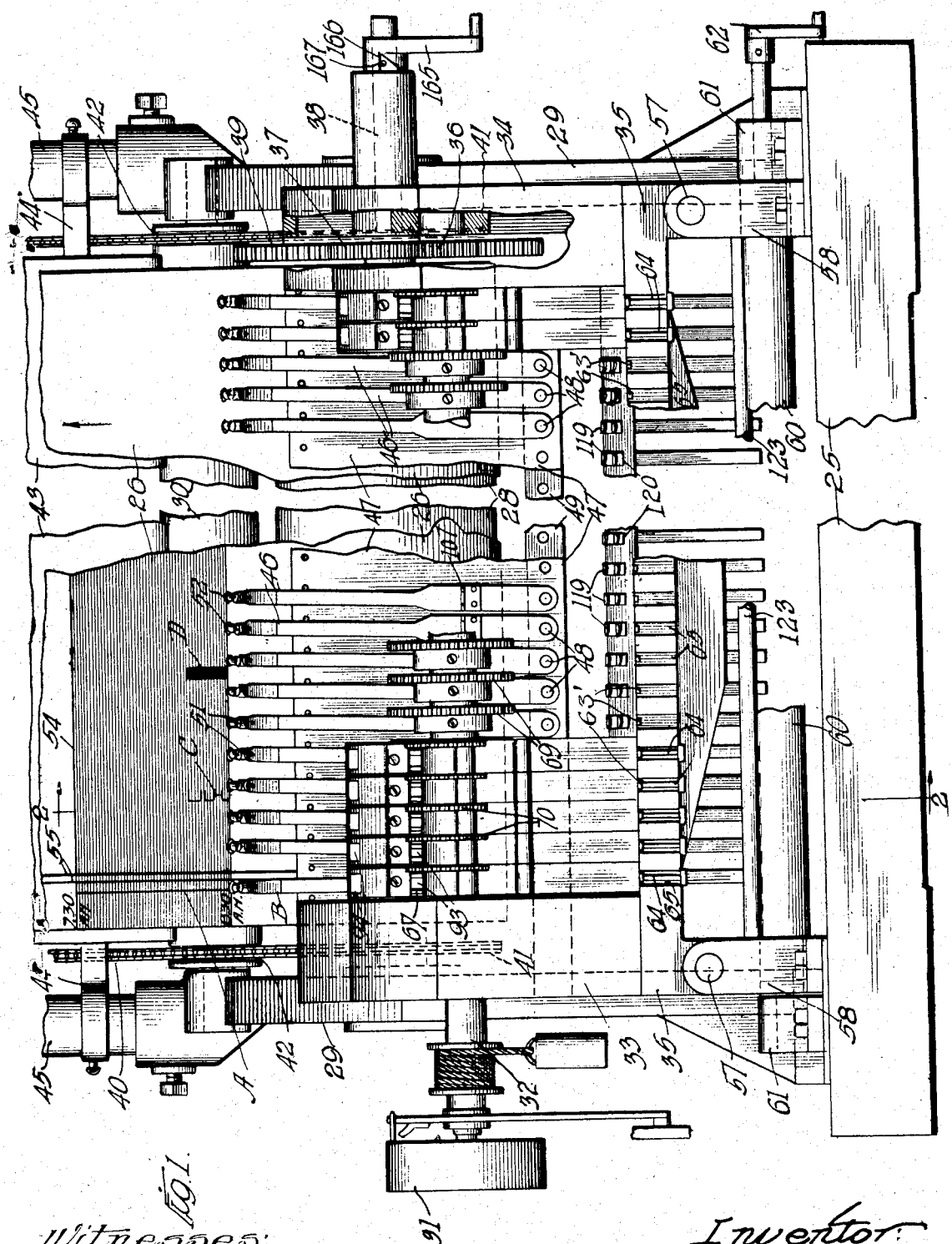
Fig. 1 is a front view of an indicating and recording machine, constructed in accordance with my invention.

Fig. 2ᵃ is a magnified view of the upper portion of the preferred form of marking stylus employed in my invention;

Fig. 3 is a side view in elevation of one of the indicating units, one of the cover plates of the same being removed so as to illustrate the arrangement and construction of the operating mechanism;

Fig. 4 is an enlarged view in section taken on line 4—4 of Fig. 3;

Fig. 5 is a side view of a combined solenoid and visual indicating minute wheel forming a part of the unit shown in Fig. 3;

Fig. 6 is an enlarged view illustrating the gear connection between the minute wheel and the hour indicating wheel of one of the indicating units;

Fig. 7 is an enlarged face view of the combined solenoid and minute indicating wheel;

Fig. 8 is a plan view of a spring contact member which provides an electrical connection for the solenoid shown in Figs. 5 and 7.

Figs. 9 and 10 are sectional views taken on lines 9—9 and 10—10 respectively of Fig. 8;

Fig. 11 is a fragmentary side view of the upper portion of the unit shown in Fig. 3, showing the position of the hour wheel. This figure is made on a larger scale than Fig. 3, and shown partly in section to clearly illustrate the stop adapted to limit the reverse movement of the hour wheel when the unit is set back to zero;

Fig. 12 is a magnified view in section of the lower portion of the indicating unit, the view being taken on line 12—12 of Fig. 3;

Fig. 13 is a detail face view of the hour indicating wheel shown in Figs. 3, 4 and 11;

Fig. 14 is a view in perspective of a mutilated pinion employed to effect an intermittent driving connection between the minute wheel and the hour indicating wheel.

Fig. 15 is a vertical sectional view of an electromagnetically operated counting device forming a part of my preferred indicating and recording apparatus;

Fig. 16 is a sectional view taken on line 16—16 of Fig. 15, looking in the direction indicated by the arrows;

Fig. 17 is a plan view with certain parts in section of a circuit making and breaking device which, when operated, closes the circuit through the electro-magnets of the indicating unit and the counting device;

Fig. 18 is a section taken on line 18—18 of Fig. 17; and

Fig. 19 illustrates the electric circuits controlling the operation of the various parts of my indicating apparatus, and also illustrates, diagrammatically the connection between the circuit closing device and the roller elevating mechanism of a printing press, the performance of which is being indicated.

In the drawings I have shown my preferred construction of apparatus for giving a visual indication and making a permanent record of the productive periods of operation of a plurality of machines. This apparatus is mounted on a base designated at 25 and consists generally of a chart 26 on which the permanent record is made, and a plurality of visual indicating units 27 which give a visual indication of the productive period of operation of the machine whose performance is being recorded. The chart 26 extends around a lower drum 28 journaled in supporting standards 29, and an upper drum (not shown) but which may be identical in construction with the drum 28. 30 designates a roller over which the chart passes and is adapted to provide a solid backing for the chart at the point where the marking element engages the chart. The chart is driven in the direction indicated by the feathered arrows in Figs. 1 and 2 by a suitable motor which is shown diagrammatically at 31 as being a clock movement. This motor is operatively connected with, and rotates uninterruptedly, a shaft 32 which preferably extends the full length of the apparatus. This shaft is journaled at opposite ends in end castings 33 and 34 of a movable supporting table 35. The said shaft 32 carries a driving pinion 36 which meshes with a pinion 37. The pinion 37 is rigidly secured to a stub shaft 38 journaled in the end casting 34 and meshes with a gear 39 which is secured to the drum shaft 28$^a$. The lower drum 28 and the upper drum previously referred to are preferably rotated in unison by means of a link belt connection consisting of chains 40 which connect a pair of sprockets 41 on the drum shaft 28$^a$ at opposite ends of the drum 28 with a similar pair of sprockets associated in substantially the same manner with the upper drum. The chains 40 also fit into grooves 42 at each end of the roller 30 and frictionally engage the same so as to impart a rotary movement to the roller. 43 designates a metal plate over which the chart passes and is supported by suitable brackets 44 secured to extensions 45 of the standard 29. It will be obvious that, if desired this plate could be extended downward so as to provide the desired backing for the chart instead of the roller 30. The permanent record of the performance of any particular machine is recorded on the chart by means of the markers 46 which, during the operation of the apparatus, are preferably in constant engagement with the chart. Such constant contact of the markers with the chart subjects the clock mechanism 31 to a substantially even load and thus insures a more steady continuous movement of the chart than would be obtained if the markers were moved into and out of contact with the chart for each active operation of the machine whose performance is being recorded. The markers 46 are pivotally secured to a plate 47 carried by the end castings 33, 34 and consist in each case of a vertically arranged arm formed at its lower end with a stud 48 which provides the pivotal axis for the marker arm. A metal strip 49 is secured to the lower edge of the plate 47 and is provided with bores which provide a wide bearing for the stud 48. A bifurcated stud 50 is secured in a boss 51 at the upper end of the arm 46 and carries a V-edged marking roller 52. The portion of the stud 50 which fits in the bore of the boss 51 is preferably reduced in diameter to provide a shoulder 53 which rests against the face of the said boss. This expedient makes it unnecessary to adjust any of the said studs longitudinally in order to secure a uniform pressure against the chart 26 by providing a uniform tension on the marking arm 46.

When the roller 52 is in contact with the chart, the marking arm 46 is preferably sprung a slight distance away from the plate 47 so as to eliminate any friction between the said plate and arm and also exert a spring pressure against the chart. The chart is preferably provided with a plurality of horizontal lines 54 indicating the minutes of each hour, and with wide vertical lines 55 (Fig. 1). The markers, when not in recording position, bear against the chart on one of the vertical lines 55. As soon as any one of the indicating units 27 is energized, as will be hereinafter described, the marker is rocked on its pivot 48 a distance sufficient to move the roller 52 off the vertical line 55 and into recording position, as indicated at A (Fig. 1.) The edge of the roller being arranged transverse to the travel of the chart, minimizes the energy required to operate the marker, and at the same time will make a prominent unbroken line to indicate each active period of the machine whose operation is being recorded. The vertical record line A in Fig. 1 indicates that the marker B has been in recording position from 7:30 a. m. to 8:30 a. m. When the performance of a machine is recorded, the operation of which is frequent and of short duration, several minutes each for example, the record line would be broken as indicated at C to show the idle periods of the machine. If the active and inactive periods of the machine are numerous, such for example as one second each, the record would show a plurality of lines as indicated at D. The roller 52 being formed with a sharp edge, will record such operations clearly.

The visual indicators are supported between the end castings 33—44 on the movable supporting table 35 which is slidably mounted on guide rods 57 journaled in bearings 58 mounted on the base 25 and is formed with depending forks 59 at opposite ends. These forks receive an eccentric rod 60 mounted in bearings 61 and provided with an operating handle 62. The indicating units are firmly secured in place by means of a feather 63 formed on the bottom of each of the units and fits into grooves 63' in the top surface of the table 35. A screw 64 is arranged in a slot 65 at the front edge of the table 35 and has a threaded engagement with the bottom of the unit whereby the said unit may be clamped tightly to the table. By turning the crank 62 the table 35 may be moved to and from the chart so as to move the markers 46 into or out of contact with the chart, as desired, and also engage or disengage the driving connection between the pinion 37 and the drum gear 39. In this connection, it will be noted that by having the clock mechanism 31 operatively connected with the driving shaft 32, instead of being directly connected, in the customary manner, to the drum 28, the chart may be moved rapidly, to any position corresponding to the time indicated by the clock 31 without affecting the operation of the clock mechanism, when the driving connection between the chart and clock mechanism is disengaged. This arrangement also, as will be hereinafter apparent, permits the visual indicators to be used if desired without making a permanent record on the chart.

Each visual indicating unit 27 is housed in a thin casing 66 (Figs. 3 and 4), of preferably non-magnetic metal. The casing of non-magnetic metal makes it possible to arrange the units closely against each other so as to provide a compact apparatus without danger of the magnetizable elements of one unit being affected by the operation of an adjacent unit. The visual indicating mechanism of each unit consists of a minute wheel 67 adapted to rotate continuously during the active period of the machine being indicated by the unit in question, and an hour wheel 68, formed with graduations on its perimeter, and operatively connected with the minute wheel 67 so as to rotate the amplitude of one graduation thereon for each complete revolution of the minute wheel.

The minute wheel is rotated by a train of gears consisting of a gear 69 secured to the shaft 32, and a gear 70 in the unit which meshes with the gear 69 and is continuously driven thereby. The gear 70 is preferably made of steel or other magnetizable metal, and is clutched to the minute wheel 67 through the agency of an electro-magnet 71 (Fig. 4). This magnet is energized by the operation of a circuit closing device 72 (Fig. 19) which is preferably closed as hereinafter described at the beginning of the active operation of the machine, which the unit in question serves to indicate, and opens so as to break the circuit controlling the said magnet when the active operation ceases. The magnet 71 preferably consists of fine insulated wire wound on a brass spool 73 and further insulated therefrom with insulation 74. The spool 73 is inserted over the hub 75 of the minute wheel and lies entirely within the periphery 76 of said wheel. The hub 75 and periphery 76 of the minute wheel constitute the magnetic poles of the electro-magnet 71. 77 designates a contact member, preferably a metal band formed with a peripheral groove 78. This contact member is fitted over the periphery 76 of the minute wheel and is insulated therefrom by means of mica strips 79, or other suitable insulating material. One end of the wire forming the magnetic coil 71 is grounded to the steel portion of the minute wheel, as indicated at 80, and the other end passes through an opening 81 in the perihpery 76 and is secured to the contact ring 77. An electric current is transmitted from the wire 82 (Fig. 3) to the contact ring 77 through a spring contact member, designated generally at 83. This contact member consists preferably of a relatively thin spring member 84 and a relatively stiff spring 85. Both of these springs are clamped together and secured to the frame 86 between insulating strips 87. The free end of the thinner spring 84 is formed with a depression 88 in which is retained a body of a graphite substance 89. The graphite substance is preferably circular in cross-section (Fig. 9) so as to fit the groove 78 of the contact ring 77. The graphite 89 may be firmly retained in the depression 88 of the contact spring 84 by any suitable means, such as by providing an overhanging ledge 90' of solder. The heavy spring 85 bears against the free end of the spring 84 and holds the same firmly against the ring 77. The graphite 89 provides a very desirable contact, and also serves as a metallic lubricant to reduce the friction and wear at the point of contact.

In order to insure perfect accuracy and reliability in the operation of the visual indicating unit, the continuously driven gear 70 is normally held against the periphery 76 of the minute wheel by means of a triangular spring 90 which is interposed between the said gear and the casing 66 (Figs. 3 and 4). This triangular spring is very light, and therefore will not cause a sufficient frictional engagement between the gear 70 and minute wheel to cause any accidental rotation of the latter, but merely exerts a force sufficient to take up any lost motion between the gear teeth of the gears 69 and 70. Any tendency, however, which this frictional engagement might have to accidentally rotate the minute wheel is offset by the force exerted by the spring contact member 83 against the contact ring 77. There is preferably a slight clearance between the core 75 of the magnet 71 and the gear 70, so that there will be no tendency of the said gear to adhere to the minute wheel after the magnet is de-energized.

The dials 91 and 92 of the minute and hour wheels, respectively, are exposed to view through openings 93 and 94 (Figs. 1, 3 and 11). The hour wheel is operated the amplitude of one graduation for each complete revolution of the minute wheel by a Geneva movement as follows: The perimeter 95 of the minute wheel 67 is formed with a notch 96 and is provided with a pair of small projections 97 at opposite sides of the notch. A small pinion 98 is interposed between the hour wheel 68 and the minute wheel 67. This pinion is mounted on a stud 99 and is formed with four full width teeth 100 and four mutilated teeth 101. The perimeter 95 of the minute wheel, when rotated slides on a pair of the full width teeth 100 until the projection 97 contacts one of the mutilated teeth and causes one of the full width teeth to enter the notch 96 so as to give the pinion 98 a one-quarter turn. All eight teeth of the pinion mesh with gear teeth 102 formed on the inner face of the hour wheel, so that when the pinion is given a one-quarter revolution by the minute wheel, it moves the hour wheel the amplitude of one graduation on the dial so as to bring the next succeeding figure on said dial in a position opposite the opening 94 in the casing of the unit.

The marking element 46 is moved into its recording position on the chart, as indicated at A in Fig. 1 by the energization of an electro-magnet 103 secured in the lower portion of the unit casing 66. The armature of the magnet 103 is designated at 104 (Figs. 3 and 4), and is preferably secured to a shaft 105 which is formed at one end with a reduced upturned crank portion 106. This reduced portion of the shaft 105 preferably fits into a fork 107 secured to the marking arm 46. When the armature 104 is attracted by the energization of the magnet 103, the arm 106 being connected with the marker will cause the marker to move to the left off the line 55 (Fig. 1) into recording position. As soon as the magnet is de-energized, the spring 108 will force the armature 104 away from the poles of the magnet and in this way return the marker 46 to its inoperative position.

109 designates an electric motor which is adapted to operate the machine whose performance is indicated and 111 designates the circuit wire leading from the knife switch 112 which effects an electrical connection between the line wire 113 with the motor 109. 114 designates a relay which is actuated by the closing of the circuit 111, to close a switch 115 in the negative wire 116 of an electric circuit connecting a generator 117 with the electro-magnet 71 and 103 of the visual indicating unit 27 and to an electro-magnet adapted to operate a counting mechanism 119, the structure of which is hereinafter described. The generator 117 is preferably driven by a suitable connection (not shown) with the motor 109 or with some suitable connection with a movable part of the machine whose performance is being recorded so as to generate an electric current of low voltage. By employing an electric current of low voltage it is practical to operate the indicating and recording mechanism with a grounded circuit.

The electric current is conducted from the generator 117 through positive wires 118, 118ª and is introduced into the magnets 103 and 71 of the unit through spring contact clips 119, 120, which fit over opposite sides of the contact stud 121 (Figs. 2 and 19). The contact clips 119—120, are mounted on an insulating block carried on the table 35. The outer end of the contact spring 119 is bent downwardly, as indicated at 119ª, to provide a contact finger adapted to engage a rod 123 which is mounted in brackets 124 and extends the full length of the table 35 and constitutes the ground connection for the negative wire 116 of the operating circuit.

The operating circuit of the electro-magnets 71 and 103 consisting of wires 118—118ª and 116—116ª are closed by a switch, preferably of the form shown in Figs. 17 and 18 of the drawings, and as indicated at 72 in Fig. 19. This switch is connected to the machine, the performance of which is to be recorded, so that the circuit through wires 118—118ª and 116—116ª, will be closed at the beginning of the active operation of the machine, and will be broken as soon as such active operation ceases. The switch 72 preferably consists of a casing having a fixed T-shaped contact member 125 to which the wire 118ª leading to the unit 27 is connected, and with a pair of spring contacts 126—127, the former of which connects with the positive wire 118 leading from the generator 117, and the latter with the wire 128 leading to the magnetically operated counting device designated generally at 122 in Fig. 19. A ground wire 116ᵇ leading from the counting device 122 and connecting with the negative wire 116, completes the operating circuit of the indicating and recording mechanism. The operating circuit of the indicating and recording mechanism is closed by means of arms 130 and 131 which are independently movable to bring either of the spring contact members 126, 127 respectively, into engagement with the T-shaped contact 125. The arm 130 is secured to a sleeve 132 which extends through a suitable bearing 133 in the casing, and carries at its outer end an operating crank 134. In the drawings I have shown the crank 134 of the switch connected to a trip mechanism of a printing press, though it will be obvious that it could be connected up in any suitable manner with other forms of machines so as to close the circuit during the working period of the operation of such machines, and open the circuit when the machine is not in active operation.

The printing press shown in Fig. 19 of the drawings is shown diagrammatically as being of the type in which the roller 135 is lowered so as to come into contact with the type plates 136 when the press is in active operation, and which is automatically raised to the dotted line position shown in this figure so as not to come into contact with the type plates during their return stroke. The press illustrated is intended to be put into operation by the release of the trip 137 which is connected to the boxing of the roller 135 through a series of bell cranks 138, 139, 140, and connecting rods 141. A rod 142 connects the trip mechanism of the printing press with the crank 134 so as to close the contact members 125, 126 and energize the magnets 71 and 103 of the indicating unit so as to clutch the continuously driven gear 70 with the minute wheel 67 and to also attract the armature 104 of the magnet 103 so as to swing the marker 46 off the heavy line 55 on the chart 26 into recording position on said chart. It will be understood that the energization of the said magnets continues only during the time that the roller 135 is in its lowered position as indicated in Fig. 19, and are de-energized throughout the entire time that the said roller is in the elevated position.

The counting device 122, forming a part of my indicating and recording apparatus automatically records the total number of active operations performed, of the printing press, for example, during the period indicated by the indicating unit 27. In order to accomplish this result I aim to connect the magnetically operated counting mechanism 122 with the switch 72, so that this mechanism will operate to record one complete active operation of the machine during each productive operating period recorded by the unit 27. The contact arm 131 adapted to close the contacts 127 and 125 controlling the circuit through the counting device 122 is secured to a shaft 142 secured in a bearing 143 of the casing of the circuit closing device, extends through the sleeve 132, and is formed with an operating crank 144 which is preferably connected with the mechanism for automatically raising the roller 135 to its dotted line position, so as to permit the type plate to move to the position shown in Fig. 19 without coming in contact with the roller after each printing operation. This automatic mechanism for raising and lowering the roller 129 is shown diagrammatically in Fig. 19 as consisting of crank 145 and bell crank 146 operatively connected by means of connecting rod 147. The operating lever 144 of the circuit closing device is connected to the crank 145 by a connecting rod 148.

In the construction above described, it will be noted that in order to close the circuit through either the indicating unit 27 or the counting mechanism 122, both contacts 126 and 127 must be engaged with the T-shaped contact 125.

149 designates a button of insulating material secured to a bolt 150 which slidably extends through the suitable apertures 151 in the outer ends of the arms 130, 131. Springs 152 hold the bolts 150 in their extended position, as indicated in Fig. 18. These bolts having a sliding connection with the arms 130, 131 permit the downward rocking movement of these arms after the said contact members 120, 127 have been moved to their closed position.

The counting mechanism designated generally at 122 consists of a counting mechanism 153 which may be of any of the well-known types now in use, and it is therefore unnecessary to illustrate this mechanism. It will be understood that the one-half revolution of the shaft 154 of this mechanism operates to record one operation on the dial wheels 155. The necessary movement of the shaft 154 is preferably produced by providing said shaft with a toothed segment 156 which is operatively connected with the rack portion 157 of the armature 158 of the electro-magnet 159. When both of the contact members 126, 127 are closed, the electric current passes through wire 118$^a$ to the indicating unit and through wire 128 to the counting device 122 so as to operate both of these devices simultaneously. The energization of the field magnet 159 and the armature magnet 158 of the counting device causes the armature to be rotated toward the magnetic poles 160, 161. This movement will cause the operating shaft 154 of the counting mechanism to be rotated a sufficient distance to operate the counting mechanism. As soon as the magnets 158—159 are de-energized, the armature is returned to the position shown in Fig. 16 by the action of a spring 158$^b$. This spring has one of its ends secured to the armature and is secured at its other end to a stud 158$^c$ which extends through the casing 122 and is provided at its outer end with a knob 158$^d$ with which the stud may be rotated to obtain proper tension of the spring. The stud may be held in its desired position by means of a lock nut designated 158$^e$.

162 designates a pad which the upper end of the armature is adapted to engage to limit its movement and prevent the core 158$^a$ thereof from coming into actual contact with the poles 160, 161. The rack 157 is preferably formed on a plate 162 of non-magnetic metal which is provided with an opening 163 which surrounds the magnetic pole 160 of the magnet 159.

I preferably employ one counting device for each of the visual indicating units 27, and these devices may obviously be incorporated with the apparatus illustrated in Fig. 1, so as to assist the superintendent, for example, to keep an accurate record of the number of productive periods indicated by the visual indicating unit; or if desired, they may be placed near the machine, the operation of which is being recorded, so as to advise the operator of the machine whether or not he is producing the necessary amount of work within the prescribed period.

In order to set all the indicating units back to zero, the table 35 is moved outwardly by operating the eccentric 60. This operation brings the extension 119$^a$ of the contact spring 119 against the grounded contact 123, and also disengages the gear 37 from the gear 39 on the drum 28; the contacts 119$^a$ being engaged with the ground contact 123, closes the circuit through the magnet 71 so as to clutch the gear 70 against the periphery of the minute wheel 67. The gear 37 is then turned backwardly so as to reverse the movement of the minute and hour wheels 67, 68. This reverse movement is facilitated by the crank 165 which is loosely mounted on the shaft 38 and is provided with notches 166 adapted to engage the stud 167 extending through the shaft 38. When the hour wheel and minute wheel of any particular unit of the apparatus have been returned to zero, a stud 168 on the periphery of the hour wheel 68 comes against the downwardly bent portion 169 of the casing adjacent the opening 94, so as to prevent any further rearward movement of either the minute wheel 67 or the hour wheel 68. The magnetic clutching action between the gear 70 and the magnet 71 will not be of sufficient strength to prevent the gear 70 from slipping when the said minute and hour wheels of any particular unit have been returned to zero while the rearward movement of another unit continues.

While I have illustrated my invention in a certain preferred embodiment and shown its application in connection with a printing press it will be understood that I do not limit myself to the exact structure shown and described or to its use in connection with the particular type of machine with which it is illustrated. I therefore contemplate all modifications and uses to which the apparatus may be applied as will come within the scope of the appended claims.

I claim:

1. In apparatus of the character described, the combination with indicating mechanism comprising a revoluble element, of driving mechanism therefor comprising a continuously driven member adapted to be operatively connected with said revoluble element and normally engaging said member to minimize lost motion in said connection with a sliding contact, and means adapted to be controlled by the machine the performance of which said apparatus indicates, for effecting said operative connection between said revoluble element and said continuously driven member.

2. In apparatus of the character described, the combination with indicating mechanism, of driving mechanism therefor comprising a continuously driven gear, means for normally holding said gear in sliding contact with said indicating mechanism, and means, adapted to be controlled by the machine the performance of which said apparatus indicates, for effecting an operative connection between said indicating and driving mechanisms.

3. In apparatus of the character described, the combination with indicating mechanism, of driving mechanism therefor comprising a continuously driven gear, a spring for normally holding said gear in sliding contact with said indicating mechanism, and means, adapted to be controlled by the machine the performance of which said apparatus indicates, for effecting an operative connection between said indicating and driving mechanisms.

4. In apparatus of the character described, the combination with indicating mechanisms, of driving mechanism therefor comprising a continuously driven gear, a triangular spring, the edges of which engage one face of said gear to normally hold said gear in sliding contact with said indicating mechanism, and means, adapted to be controlled by the machine the performance of which said apparatus indicates, for effecting an operative connection between said indicating and driving mechanisms.

5. In apparatus of the character described, the combination with indicating mechanism, of driving mechanism therefor comprising a continuously driven gear, means for normally holding said gear in sliding contact with said indicating mechanism during the inactive period of the same, and electro-magnetic means, adapted to be controlled by the operation of the machine the performance of which said apparatus indicates, for effecting a driving connection between the said indicating and driving mechanisms.

6. In apparatus of the character described, the combination with indicating mechanism, of driving mechanism therefor comprising a continuously driven gear, means for normally holding said gear in sliding contact with said indicating mechanism during the inactive period of the same, and electro-magnetic means, adapted to be energized by the active operation of the machine the performance of which the apparatus indicates, for effecting a driving connection between the said indicating and driving mechanisms.

7. In apparatus of the character described, the combination with indicating mechanism, of driving mechanism therefor comprising a train of continuously driven gears, means for normally holding one gear of said train in sliding contact with said indicating mechanism during the inactive period of the same, and electro-magnetic means, adapted to be energized by the active operation of the machine the performance of which said apparatus indicates, for effecting a driving connection between the said indicating and driving mechanisms.

8. In apparatus of the character described, the combination with indicating mechanism, of driving mechanism therefor comprising a continuously driven magnetizable gear normally held in sliding engagement with said indicating mechanism, and an electro-magnet, adapted to be energized through the agency of the machine the performance of which said apparatus indicates, to effect an operative engagement between said driving and indicating mechanisms.

9. In apparatus of the character described, the combination with indicating mechanism, of driving mechanism therefor comprising a continuously driven train of gears, one of said gears being magnetizable and normally slidably engaging said indicating mechanism, and an electro-magnet adapted to be energized through the agency of the machine the performance of which said apparatus indicates, to effect an operative engagement between said magnetizable gear and indicating mechanism.

10. In apparatus of the character described, an indicating unit comprising a continuously movable gear, a revoluble indicating element having a normal sliding engagement with said continuously movable gear, and an electro-magnet which when energized effects an operative engagement between said gear and indicating element.

11. In apparatus of the character described, an indicating unit comprising a continuously movable, magnetizable gear, a revoluble indicating element having a normal sliding engagement with said continuously movable gear, and an electro-magnet which when energized effects an operative engagement between said gear and indicating element.

12. In apparatus of the character described, an indicating unit comprising a continuously movable, magnetizable gear, a revoluble indicating element having a normal sliding engagement with said continuously movable gear and provided with a dial having graduations thereon, and an electro-magnet which when energized effects an operative engagement between said gear and indicating element.

13. In apparatus of the character described, an indicating unit comprising a continuously movable gear, a revoluble indicating element having a normal sliding engagement with said continuously movable gear and provided with graduations corresponding to fractions of an hour thereon, an electro-magnet which when energized effects an operative engagement between said gear and indicating element, and a second revoluble indicating element having an intermittent operative connection with said first mentioned indicating element.

14. In apparatus of the character described, an indicating unit comprising a continuously movable gear, a revoluble indicating element having graduations corresponding to fractions of an hour thereon and adapted to normally slidably engage said continuously movable gear to take up lost motion, an electro-magnet which when energized effects an operative engagement between said gear and indicating element, and a second revoluble indicating element having graduations to indicate fixed time periods and having an intermittent operative connection with said first mentioned indicating element whereby the said second revoluble indicating element is rotated the amplitude of one graduation thereon for each complete revolution of said first mentioned revoluble indicting element.

15. In apparatus of the character described, a visual indicating unit comprising a revoluble indicating element, driving mechanism therefor comprising a continuously driven gear adapted to be clutched to said indicating element, and an electro-magnet for effecting the said clutching engagement between said continuously driven gear and indicating element.

16. In apparatus of the character described, a visual indicating unit comprising a revoluble indicating element, driving mechanism therefor comprising a continuously driven gear adapted to be clutched to said indicating element, and an electro-magnet revolubly supported by said indicating element and adapted when energized to effect the said clutching engagement between said continuously driven gear and indicating element.

17. In apparatus of the character described, an indicating unit comprising a continuously driven gear, and a revoluble indicating element comprising a shell and an electric coil carried thereby which together constitute an electro-magnet which, when energized, effects a clutching engagement between said gear and indicating element.

18. In apparatus of the character described, an indicating unit comprising a continuously driven gear, and a revoluble indicating element comprising an annular shell and an electric coil carried thereby which together constitute an electro-magnet which, when energized, effects a clutching engagement between said gear and the periphery of said shell.

19. In apparatus of the character described, an indicating unit comprising a continuously driven gear, a revoluble indicating element comprising an annular shell and an electric coil carried thereby which together constitute an electro-magnet which, when energized, effects a clutching engagement between said gear and the periphery of said shell, and means providing an electrical connection for said coil comprising a ring carried by said shell and a spring contact engaging said ring.

20. In apparatus of the character described, an indicating unit comprising a gear and a revoluble indicating element, said element comprising an annular shell and an electric coil carried thereby which together constitute an electro-magnet adapted, when energized, to effect a clutching engagement between said gear and indicating element, and means providing an electrical connection for said coil comprising a spring contact member adapted to engage the periphery of said indicating element.

21. In apparatus of the character described, an indicating unit comprising a gear and a revoluble indicating element, said element comprising an annular shell and an electric coil carried thereby which together constitute an electro-magnet adapted when energized to effect a clutching engagement between said gear and indicating element, and means providing an electrical connection for said coil comprising a grooved contact ring fitted on the periphery of said shell, insulation inserted between the shell and ring, and a spring contact having a graphite contacting surface adapted to fit into the groove of said contact wheel.

22. In apparatus of the character described, an indicating unit comprising a gear and a revoluble indicating element, said element comprising an annular shell and an electric coil carried thereby which together constitute an electro-magnet adapted when energized to effect a clutching engagement between said gear and indicating element, and means providing an electrical connection for said coil comprising a grooved contact ring fitted on the periphery of said shell, insulation inserted between the shell and ring, and a spring contact having a graphite lubricating substance providing a contacting surface adapted to fit into the groove of said contact wheel.

23. In apparatus of the character described, an indicating unit comprising a gear and a revoluble indicating element, said element comprising an annular shell and an e... ic coil carried thereby which together constitute an electro-magnet adapted when energized to effect a clutching engagement between said gear and indicating element, means providing an electrical connection for said coil comprising a grooved contact ring fitted on the periphery of said shell, insulation inserted between the shell and ring, a relatively flexible spring contact having a graphite lubricating substance providing a contacting surface adapted to fit into the groove of said contact wheel, and a heavier spring adapted to bear against the contact end of said first mentioned spring.

24. In apparatus of the character described, the combination with a fixed support, of chart mechanism thereon, a movable support, driving mechanism on said movable support, a plurality of separately removable visual indicating units carried on said movable support and engaged with said driving mechanism, and means for moving said movable support to effect an operative engagement of the driving mechanism with said chart mechanism.

25. In apparatus of the character described, the combination with a fixed support, of chart mechanism thereon, a movable support, driving mechanism on said movable support, a plurality of pivoted marking elements on said movable support, a plurality of separately removable visual indicating units carried on said movable support and engaged with said driving mechanism, and means for moving said movable support to bring said marking elements into contact with the chart and to effect an operative engagement of the driving mechanism with said chart mechanism.

26. In apparatus of the character described, the combination with a fixed support, of chart mechanism thereon, a movable support, driving mechanism on said movable support, a plurality of pivoted marking elements on said movable support, a plurality of separately removable visual indicating units carried on said movable support and engaged with said driving mechanism and marking elements, and means for moving said movable support to bring said marking elements into contact with the chart and to effect an operative engagement of the driving mechanism with said chart mechanism.

27. In apparatus of the character described, the combination with a fixed support, of chart mechanism thereon, a movable support, driving mechanism on said movable support, a plurality of pivoted marking elements on said movable support, a plurality of separately removable visual indicating units operatively engaged with said marking elements, each unit comprising a pair of electro-magnets for operating a marking element and for effecting a clutching engagement of the driving mechanism with the said unit, and means for moving said movable support to bring said marking elements into contact with the chart and to effect a driving connection between said driving mechanism and chart mechanism.

28. In apparatus of the character described, the combination with a fixed support, of chart mechanism thereon, a movable support, driving mechanism on said movable support adapted to give travel to said chart mechanism, and a plurality of pivoted marking elements carried on said movable support and adapted to bear with uniform pressure against the chart.

29. In apparatus of the character described, the combination with a fixed support, of chart mechanism thereon, a movable support, driving mechanism on said movable support adapted to give travel to said chart mechanism, a plurality of pivoted marking elements carried on said movable support and adapted to bear with uniform pressure against the chart, and electro-magnets for operating said marking elements to make a mark on said chart.

30. In apparatus of the character described, the combination with a fixed support, of a chart mechanism thereon a movable support, driving mechanism on the movable support adapted to impart travel to said chart mechanism when said movable support is in its forward position and to be disconnected from said chart mechanism when said support is moved to its rear position, a plurality of indicating mechanisms on said movable support, an electro-magnet for each of said indicating mechanisms adapted to operatively connect the same with the driving mechanism, and means for simultaneously energizing all of said electro-magnets so as to reset the indicating mechanisms to zero by reversing said driving mechanisms.

31. In apparatus of the character described, the combination with a fixed support, of a movable support, driving mechanism on the movable support, a plurality of indicating mechanisms on said movable support, an electro-magnet for each of said indicating mechanisms adapted to operatively connect the same with the driving mechanism, and means comprising a contact member extending lengthwise of the movable support and contact members for each of said electro-magnets adapted to engage the first mentioned contact member when the movable support is moved in one direction to simultaneously energize all of said electro-magnets so as to reset the indicating mechanisms to zero by reversing said driving mechanism.

32. In apparatus of the character described, the combination with a fixed support, of a movable support, driving mechanism thereon, a plurality of indicating mechanisms on said movable support, an electro-magnet for each of said indicating mechanisms adapted to operatively connect the same with the driving mechanism, and means comprising a grounded contact member extending lengthwise of the movable support and contact members for each of said electro-magnets adapted to engage the said grounded contact member when the movable support is moved in one direction to simultaneously energize all of said electro-magnets so as to reset the indicating mechanisms to zero by reversing said driving mechanism.

33. In apparatus of the character described, the combination with time operated indicating mechanism for indicating the total active time period of a machine performing a series of active operations, and means controlled by the operation of the machine, the performance of which is being indicated, for giving a visual indication of the total active operations of said machine during the total time period indicated by said time operated indicating mechanism.

34. In apparatus of the character described, the combination with time operated indicating mechanism for indicating the total active time period of a machine performing a series of active operations, and an electro-magnetically operated counting device controlled by the operation of the machine, the performance of which is being indicated, for giving a visual indication of the number of active operations of said machine during the total time period indicated by said time operated indicating mechanism.

35. In apparatus of the character described, the combination with time operated indicating mechanism for indicating the total active time period of a machine performing a series of active operations, and a counting device comprising counting mechanism and an electro-magnet controlled by the operation of the machine whose performance is being indicated and adapted when energized to indicate one active operation of said machine.

36. In apparatus of the character described, the combination with time operated driving mechanism, of a visual indicating unit, an electro-magnet for effecting an operative connection between said driving mechanism and unit, a circuit making and breaking device operated by the productive operation of the machine whose performance is being indicated to close an electric circuit to energize said magnet and set said indicating unit into operation, and a counting device which is operative only when the said indicating unit is operating.

37. In apparatus of the character described, the combination with time operated driving mechanism, of a visual indicating unit, an electro-magnet for effecting an operative connection between said driving mechanism and unit, a circuit making and breaking device operated by the productive operation of the machine whose performance is being indicated to close an electric circuit to energize said magnet and set said indicating unit into operation, and a counting device, the operation of which is controlled by the closing of said circuit making and breaking device, whereby the counting device is operative only when the said indicating unit is operating.

38. In apparatus of the character described, the combination with indicating mechanism comprising means controlled by the operation of a machine, whereby the productive time period of a series of separate active operations of such machine is indicated, and means controlled by the operation of said machine for indicating the total number of operations included in the productive period indicated by said indicating mechanism.

39. In apparatus of the character described, the combination with indicating mechanism comprising means controlled by the operation of a machine whereby the productive time period covering a plurality of separate operations of such machine is indicated, means controlled by the operation of said machine for recording the separate operations included in the productive period indicated by said indicating mechanism, and means controlled by the operation of said machine for indicating the total number of said operations.

40. An electrically operated counting device having an operating shaft, a gear on said shaft, a pivoted rack member engaging said gear, electromagnetic means for operating said rack member comprising a fixed electromagnet and a pivoted electromagnet, secured to said rack and providing an armature for said fixed magnet whereby the pivoted magnet and said rack are oscillated when said magnets are energized.

41. An electrically operated counting device having an operating shaft, a gear on said shaft, a pivoted rack member engaging said gear, electromagnetic means for operating said rack member comprising a fixed electromagnet having laterally projecting poles, an armature comprising an electromagnet secured to said rack and adapted to oscillate toward the poles of said first mentioned magnet when said magnets are energized.

AUSTIN C. JOHNSON.